United States Patent [19]
Ohmi et al.

[11] Patent Number: 6,093,662
[45] Date of Patent: Jul. 25, 2000

[54] METHOD FOR GENERATING WATER FOR SEMICONDUCTOR PRODUCTION

[75] Inventors: Tadahiro Ohmi, 1-17-301, Komegahukuro 2-Chome, Aoba-ku, Sendai-shi, Miyagi 980-0813; Yukio Minami; Koji Kawada, both of Osaka; Yoshikazu Tanabe, Tokyo; Nobukazu Ikeda; Akihiro Morimoto, both of Osaka, all of Japan

[73] Assignees: Fujikin Incorporated, Osaka; Tadahiro Ohmi, Miyagi, both of Japan

[21] Appl. No.: 09/242,137
[22] PCT Filed: Jun. 12, 1998
[86] PCT No.: PCT/JP98/02660
§ 371 Date: Apr. 14, 1999
§ 102(e) Date: Apr. 14, 1999
[87] PCT Pub. No.: WO98/57884
PCT Pub. Date: Dec. 23, 1998

[30] Foreign Application Priority Data
Jun. 17, 1997 [JP] Japan .................... 9-159571
[51] Int. Cl.[7] .................... H01L 21/31; H01L 21/469
[52] U.S. Cl. .................... 438/773; 438/769; 427/255.1; 427/255.2
[58] Field of Search .................... 438/769, 770, 438/773; 427/255.1, 255.2, 255.3

[56] References Cited

U.S. PATENT DOCUMENTS 5,360,768  11/1994  Ohmi et al. .................... 438/770
5,656,099   8/1997  Ohmi .................... 148/280
5,840,368  11/1998  Ohmi .................... 438/773
5,888,357   3/1999  Mitsumori et al. .................... 204/157.42

FOREIGN PATENT DOCUMENTS 6-115903   4/1994  Japan .
10-007403  1/1998  Japan .

Primary Examiner—Kevin M. Picardat
Attorney, Agent, or Firm—Griffin, Butler, Whisenhunt & Szipl, LLP

[57] ABSTRACT

Process for generating moisture for use in semiconductor manufacturing, the process comprising feeding hydrogen and oxygen into a reactor provided with a platinum-coated catalyst layer on an interior wall, thus enhancing the reactivity between hydrogen and oxygen by catalytic action and instantaneously reacting the reactivity-enhanced hydrogen and oxygen at a temperature below the ignition point to produce moisture without undergoing combustion at a high temperature, wherein the amount of unreacted hydrogen occurring in the generated moisture in starting up or terminating the moisture generating reaction is minimized and wherein undesired reactions such as undesired silicon oxide film coating are avoided. When the generation of moisture is started up by feeding hydrogen and oxygen into the reactor provided with a platinum-coated catalyst layer on the inside wall thereof, oxygen first starts to be fed and, some time after that, the supply of hydrogen is begun. In terminating the moisture generating operation by cutting off the supply of hydrogen and oxygen into the reactor, the feeding of hydrogen is first stopped and, some time after that, the supply of oxygen is shut off.

7 Claims, 12 Drawing Sheets

METHOD FOR GENERATING WATER FOR SEMICONDUCTOR PRODUCTION

This is the U.S. National Stage of International Application No. PCT/JP98/02660, filed Jun. 12, 1998.

FIELD OF THE INVENTION

This invention relates to improvements in a method of operating a reactor for the generation of water that is intended for use in semiconductor manufacturing operations. More particularly, the present invention relates to the procedure for generating moisture for use in oxide film coating in a reaction chamber. This procedure may be referred to as a moisture oxidation method, a wet oxygen oxidation method, or a steam oxidation method.

BACKGROUND OF THE INVENTION

In the manufacture of semiconductor elements, the conventional so-called dry oxygen oxidation method of silicon oxide film coating by thermal oxidation has been largely replaced by the moisture oxidation process, which is also called the wet oxygen oxidation method and the steam oxidation method. The moisture oxidation method provides a silicon oxide film which is superior to that obtained by the dry oxygen oxidation method in such properties as insulation strength and masking effect.

Applicants had earlier developed a reactor for the generation of moisture by the aforesaid moisture oxidation method, as illustrated in FIG. 10. This was a supply source of super high-purity water for use in silicon oxide film coating. The reactor was disclosed in unexamined Japanese patent application No. 08-242246. Reactor 1 as shown in FIG. 10 comprises heat-resistant reactor structural components 2 and 3, a gas feed joint 4 and a moisture gas take-out joint 5 provided on reactor structural components 2 and 3, a reflector unit 9 on the inlet side provided inside first reactor structural component 2 opposite a feed gas passage 4a and a reflector unit 12 on the outlet side provided inside the second reactor structural component 3 opposite a moisture outlet passage 5a, a diffusion filter 10 provided between the two reactor structural components 2 and 3, and a platinum-coated catalyst layer 13 provided on an inside surface of the second reactor structural component 3.

The platinum-coated catalyst layer 13, which is formed on the inside wall surface of reactor structural component 3, is of a double layer construction, having a barrier coat 13a with a platinum coat 13b formed thereupon. The barrier coat 13a is formed of a nitride such as TiN, on which the platinum coat 13b is fixed by a vapor deposition technique or an ion coating technique.

In the arrangement depicted in FIG. 10, hydrogen and oxygen are fed into reactor 1 through gas feed passage 4a and diffused by a gas diffusion means 8 which comprises the inlet reflector unit 9, the filter 10, and the outlet reflector unit 12. The hydrogen and oxygen then come into contact with platinum-coated catalyst layer 13. Upon coming into contact with the platinum-coated catalyst layer 13, hydrogen and oxygen are enhanced in reactivity by catalytic action, being transformed into what is referred to as a radicalized state. Radicalized, hydrogen and oxygen react instantaneously with one another to produce water without undergoing combustion at a high temperature.

The reactor as shown in FIG. 10 is recognized as constituting a significant advance in semiconductor manufacturing technology. The reactor can be built in a substantially reduced size but can produce super high-purity water, or a mixture gas of super high-purity water and oxygen, at the rate of 1000 sccm or cc/minute in terms of the standard conditions with a high level of reactivity and response characteristics or responsiveness. To illustrate, three cases of moisture generation will be described using a reactor 1 having the construction shown in FIG. 10. The reactor 1 used was about 134 mm in outside diameter, about 70 mm in thickness, and about 490 cubic centimeters (cc) in inside volume.

The material gases of hydrogen and oxygen are fed at three different rates: Case A, hydrogen at 1000 sccm and oxygen at 1000 sccm; Case B, hydrogen at 1000 sccm and oxygen at 500 sccm; and Case C, hydrogen at 1500 sccm and oxygen at 500 sccm. The reactor turns out approximately 1000 sccm of a mixed gas of water and oxygen in Case A, approximately 1000 scam of water in Case B, and approximately 1000 sccm of a mixed gas of water and hydrogen in Case C, all at a reactor temperature of about 400° C. with a moisture generation reaction rate of approximately 99 percent.

FIG. 11 illustrates changes with time in moisture generation reaction rate at a reactor temperature of about 400° C. in the aforesaid reactor. FIG. 11 demonstrates that the reactor can produce super high-purity moisture with a moisture generation reaction rate of approximately 98.5 to 99.0 percent, whether the material gas mixture is oxygen-rich as in Case A or hydrogen-rich as in Case C.

However, it has been found that reactor 1 as illustrated in FIG. 10 can be improved, particularly with regard to safety. That is, it is difficult to raise the moisture generation reaction rate to more than approximately 99.0 percent when the reactor is operated at a temperature not higher than about 400° C. and at a moisture generation rate of more than approximately 1000 sccm. This leaves approximately one percent of the oxygen and hydrogen unreacted in the moisture which is generated. As a result, it is impossible to extract hydrogen-free moisture or a mixture of hydrogen-free moisture and oxygen and to eliminate the possible danger of explosive combustion of hydrogen in the oxidation chamber where the mixture is introduced.

Another problem with the configuration of reactor 1 as illustrated in FIG. 10 is responsiveness in the reaction of oxygen and hydrogen to produce moisture. Even where the moisture generation reaction rate can be raised to approximately 99.8 percent in normal operation to minimize the amount of unreacted hydrogen flowing into the oxidation chamber, the reaction rate cannot necessarily be maintained at that high level at the times when the reactor 1 is started up or shut down. There is thus still a concern that unreacted hydrogen can flow into the oxidation chamber at these times.

The region indicated by the letter J in FIG. 12 shows the moisture generation responsiveness (i.e., transitional changes in the contents of oxygen and hydrogen in the moisture generated and the amount of the generated moisture) in which feeding of hydrogen and oxygen into the reactor as shown in FIG. 10 is simultaneously (time difference=0 seconds) started and stopped. The measurements were taken using a quadrupole mass spectrometer (Q-mass spectrometer). In the region indicated by the letter J, the amount of unreacted hydrogen in the generated moisture peaked at A1 and A2, that is, at the time the feeding of the material gas mixture was started and also suspended. The measurements shown in FIG. 12 were taken with a material gas mixture of 1000 sccm of hydrogen and 600 sccm of oxygen (a 20 percent oxygen rich mixture). The reactor temperature was 400° C. The nitrogen gas indicated in the Figure, fed at the rate of approximately 1000 sccm, was to purge the reactor 1. The feeding of the nitrogen gas was stopped at the time that oxygen and hydrogen feeding began, and was resumed at the same time that the supply of oxygen and hydrogen was suspended.

While it is not clearly known why the amount of unreacted hydrogen in the generated moisture reaches a peak at A1 and A2 when the feeding of hydrogen and oxygen is started and suspended, it is found that as the richness of hydrogen in the material gas mixture gets higher, the peaks A1 and A2 get higher.

That the amount of unreacted hydrogen rises when the reactor for the generation of moisture is started or stopped is a problem that cannot be ignored, because this phenomenon exposes equipment using the moisture generated, such as the silicon oxidation chamber, to danger. Accordingly, the inventors conducted extensive experiments seeking to determine why the amount of unreacted hydrogen in the moisture that was generated peaked at the time of start-up or suspension of the operation of the moisture generation reactor, and how that could be prevented.

As a result, the inventors have discovered that the hydrogen peak in the generated moisture could be minimized by starting to feed hydrogen after starting to feed oxygen at the start-up time and terminating the feeding of hydrogen before terminating the supply of oxygen at the time of suspension of moisture generation. But the problem is that if the feeding of hydrogen is delayed at moisture generation start-up time, unreacted oxygen can flow into the oxidation chamber. That will put the silicon element of an oxidation film coating process into dry oxygen oxidation. As a result, oxidation film coating by the moisture oxidation process is hindered. On the other hand, suspending the supply of hydrogen earlier than suspension the supply of oxygen has little adverse effect on the film coating process because the formation of silicon oxide film has been completed by that time, However, the loss of oxygen increases and the operating rate of the silicon oxidation chamber decreases.

The present invention addresses these problems encountered with the reactor 1 illustrated in FIG. 10.

SUMMARY OF THE INVENTION

It is an object of the present invention to solve problems associated with the reactor for the generation of moisture as shown in FIG. 10. Among the problems, when the feeding of hydrogen is overly delayed at the time of starting the moisture generating operation in order to secure the safety of the silicon oxidation chamber, a silicon film coating process by dry oxygen oxidation will take place, adversely affecting the quality of the silicon oxide film. Also, if the supply of hydrogen is stopped earlier than suspension of the supply of oxygen at the termination of the operation, the consumption of oxygen will rise with the operating rate of the silicon oxidation chamber dropping.

It is an object of the present invention to provide a process for generating moisture, for use in semiconductor manufacturing, that solves the aforementioned problems. The process comprises the steps of commencing the supply of hydrogen a minimum required time after commencing the supply of oxygen in starting up the reactor, and suspending the supply of hydrogen a minimum required time before suspending the supply of oxygen in terminating the operation. This effectively reduces an amount of unreacted hydrogen in the moisture, thus raising the safety of the silicon chamber, and at the same time keeps the quality of silicon oxide film at a high level and keeps down the consumption of oxygen.

To solve the foregoing problems, extensive experiments were conducted using a testing unit as illustrated in FIG. 1 to study moisture generation responsiveness. In the experiment, oxygen and hydrogen at various mixing ratios were fed into the moisture generation reactor to determine the moisture generation responsiveness at the start-up time and at the termination time of operation.

In FIG. 1, reference numeral 1 indicates a reactor of the construction illustrated in FIG. 10; MFC1 to MFC3, mass flow controllers; V1 to V6, valves; SV, a suction-regulating valve; E, a Q-mass spectrometer; P, a vacuum pump (rotary pump); D, a turbo molecular pump; and R, a moisture-collecting reservoir. Moisture is condensed at room temperature and the condensed moisture is collected.

For determination of the responsiveness at the time of starting up the operation, the flow rates of hydrogen, oxygen, and nitrogen were set by means of the mass flow controllers MFC1 to MFC3, at three different levels, i.e., Cases 1, 2, and 3. For determination of the responsiveness at the time of terminating the operation, two different levels were set, i.e., Cases 4 and 5.

| Case 1 | $H_2$ | 1000 sccm | $O_2$ | 600 sccm | $N_2$ | 1000 sccm |
|---|---|---|---|---|---|---|
| Case 2 | $H_2$ | 1000 sccm | $O_2$ | 1000 sccm | $N_2$ | 1000 sccm |
| Case 3 | $H_2$ | 500 sccm | $O_2$ | 600 sccm | $N_2$ | 1000 sccm |
| Case 4 | $H_2$ | 1000 sccm | $O_2$ | 600 sccm | $N_2$ | 1000 sccm |
| Case 5 | $H_2$ | 1000 sccm | $O_2$ | 600 sccm | $N_2$ | 15000 sccm |

First, in Cases 1, 2, and 3, where the responsiveness was measured at the start-up time, the concentrations of hydrogen, oxygen, water, and nitrogen in the generated moisture were determined by Q-mass spectrometry with the measuring interval (measuring time) regulated to one second by actuating suction valve SV. The determination was made with the feeding of the material gases changed in four different modes by manipulating the valves V1 to V3: simultaneously supplying oxygen and hydrogen (indicated by the letter J in FIGS. 2 to 4), delaying feeding of hydrogen one second (indicated by the letter K), delaying the feeding of hydrogen by two seconds (indicated by the letter L), and delaying the feeding of hydrogen three seconds (indicated by the letter M). The Q-mass spectrometer used was a model MSQ-150A Quadrupole Mass Analyzer manufactured by ULVAC Corporation of Japan. In using the Q-mass spectrometer, moisture, if present in the atmosphere, will be decomposed, boosting the hydrogen background. Therefore, the analyzer is not very high in accuracy, but it can detect a change in hydrogen content exceeding 0.1 percent, and thus serves the purpose of the present experiments.

In these experiments, the supply of oxygen and hydrogen was simultaneously stopped when the reactor 1 was put out of operation Nitrogen was used for purging the reactor. The moment the feeding of oxygen was started, the valve V3 was closed to stop the supply of nitrogen. At the same time that the supply of hydrogen and oxygen was suspended, the valve V3 was opened to start supplying nitrogen to the system. The valves V1 to V3 were switched between the fully opened position and the fully closed position. The start-up and cut-off of the feeding of oxygen, hydrogen, and nitrogen were relatively sudden.

FIG. 2 shows the results of measurements taken by Q-mass spectrometry when the rector for the generation of moisture was started in Case 1, FIG. 3 shows the results in Case 2, and FIG. 4 illustrates the measurements in Case 3. FIGS. 2 to 4 show that if commencement of the feeding of hydrogen is delayed by at least two seconds as against the feeding of oxygen in starting up the reactor for the generation of moisture, the amount of hydrogen in the generated moisture will have no peak $A_1$. It is also indicated that where the oxygen richness is high, as in Case 2 (FIG. 3) and Case 3 (FIG. 4), delaying commencement of the supply of hydrogen by about one second is enough.

It is noted that in measurements in FIG. 2 (Case 1) to FIG. 4 (Case 3), the valves V1 to V3 were quickly switched from the fully closed position to the fully opened position to make a sudden start of full feeding of oxygen and hydrogen. But if the feeding of hydrogen and oxygen at the start-up time is gradually increased by using mass flow controllers MFC1 and MFC2 in what is called a slow start, the peak $A_1$ of the hydrogen amount in the generated moisture will be smaller. That can make the required delay time shorter than approximately two seconds needed in FIG. 2 (Case 1) and approximately one second needed in FIG. 3 (Case 2) and FIG. 4 (Case 3).

In Cases 4 and 5, where the responsiveness was measured at the time of suspending the operation of the reactor, also, the concentrations of hydrogen, oxygen, water, and nitrogen in the generated moisture were determined by Q-mass spectrometry with the measuring interval (measuring time) regulated to one second by actuating the suction valve SV. The determination was made with the feeding of the material gases changed in three different modes by manipulating the valves V1 to V3 as operation of the reactor for moisture generation was terminated: suspending the feeding of hydrogen two seconds earlier than suspending the feeding of oxygen (indicated by the letter N in FIG. 5), suspending the feeding of hydrogen five seconds earlier (indicated by the letter O in FIG. 5), and suspending the feeding of hydrogen ten seconds earlier (indicated by the letter P in FIG. 5). The other details, including the switching operation of the valves V1 to V3, were identical with those for determination of responsiveness in the start-up. It is also noted that the feeding of hydrogen was started 20 seconds after oxygen feeding in the start-up of the reactor.

FIGS. 5 and 6 show the results of measurements taken by Q-mass spectrometry under the conditions of Case 4 and Case 5 when the moisture generation reactor was stopped. It is shown that where the flow rate of the purging gas nitrogen is relatively small at 1000 sccm as in Case 4 (FIG. 5), suspending the feeding of hydrogen approximately two seconds earlier than suspending oxygen feeding can bring down the peak $A_2$ of hydrogen in the generated moisture to an almost negligible level.

In Case 5 (FIG. 6), where the flow rate of the purging gas nitrogen is approximately 15 times higher (15,000 sccm), hydrogen and oxygen in the reactor 1 will be instantaneously blown out unreacted into the generated moisture by the purging gas nitrogen, because the time for hydrogen and oxygen to react will be shortened by the sudden rush of the purging gas, with the flow velocity of hydrogen and oxygen suddenly rising several times or more to reduce the concentration. That makes it difficult for the two elements to react with one another. For that reason, it is necessary to suspend the feeding of hydrogen approximately five seconds earlier in Case 5.

It is noted that as with hydrogen and oxygen, the full feeding of nitrogen abruptly starts up with the valve V3 switched from the fully closed position to the fully opened position. If the feeding of nitrogen is gradually increased by using a mass flow controller MFC3 in what is called a slow start, the peak $A_2$ of the hydrogen amount in the generated moisture will be smaller. That can shorten the required time of approximately five seconds by which time the suspension of hydrogen feeding is advanced as against the suspension of oxygen feeding.

Also, even when the feeding of hydrogen is stopped a little too early in terminating the generation of moisture, the adverse effect on the silicon oxide film coating is relatively small. This is because the outer surface of the silicon is already coated with a silicon oxide film by the moisture oxidation process, and hardly any film coating by a dry oxygen oxidation will then take place.

The present invention is founded on the moisture generation responsiveness results determined by using the Q-mass spectrometer.

The present invention as defined in claim 1 provides a process, for the generation of moisture for use in semiconductor manufacturing, comprising the steps of feeding hydrogen and oxygen into a reactor provided with a platinum-coated catalyst layer on an interior wall, enhancing the reactivity of hydrogen and oxygen by catalytic action, and allowing the reactivity-enhanced hydrogen and oxygen to react instantaneously at a temperature below the ignition point to produce moisture without undergoing combustion at a high temperature, wherein hydrogen is fed initially only after oxygen has begun to be fed in starting up the moisture generation operation.

The present invention as claimed in claim 2 provides a process for generating moisture for use in semi-conductor manufacturing as defined in claim 1, wherein hydrogen starts to be fed at least one second after oxygen has started to be fed.

The present invention as claimed in claim 3 provides a process for generating moisture for use in semi-conductor manufacturing as defined in claim 1, wherein hydrogen starts to be fed one second to two seconds after oxygen has started to be fed.

The present invention as defined in claim 4 provides a process, for the generation of moisture for use in semiconductor manufacturing, comprising the steps of feeding hydrogen and oxygen into a reactor provided with a platinum-coated catalyst layer on an interior wall, enhancing the reactivity of hydrogen and oxygen by catalytic action, and allowing the reactivity-enhanced hydrogen and oxygen to react instantaneously at a temperature below the ignition point to produce moisture without undergoing combustion at a high temperature, wherein the feeding of hydrogen is stopped before the feeding of oxygen is stopped in terminating the moisture generation operation.

The present invention as claimed in claim 5 provides a process for generating moisture for use in semi-conductor manufacturing as defined in claim 4, wherein the feeding of hydrogen is stopped at least two seconds before the feeding of oxygen is stopped.

The present invention as claimed in claim 6 provides a process for generating moisture for use in semi-conductor manufacturing as defined in claim 1 or claim 4, wherein the temperature of the reactor is held at not higher than 500° C.

The present invention as claimed in claim 7 provides a process for generating moisture for use in semi-conductor manufacturing as defined in claim 1 or claim 4, wherein the reactor is made of stainless steel and wherein the platinum-coated catalyst layer is made up of a platinum coat fixed on a barrier coat of nitride formed on an inside wall of an interior space of the reactor.

DESCRIPTION OF THE PREFERRED EMBODIMENTS

EXAMPLE 1

Figure 1:
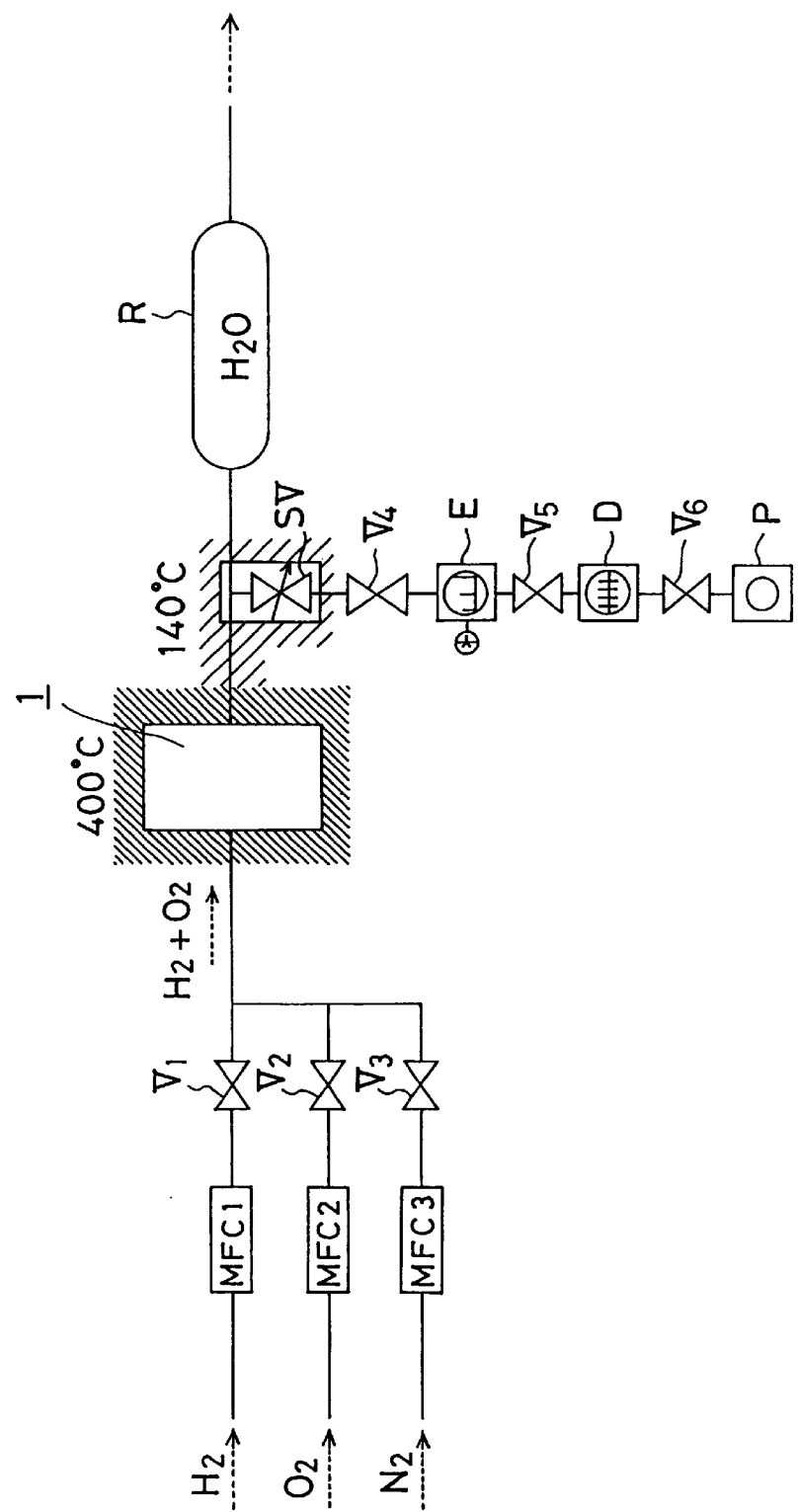
FIG. 1 is a schematic system diagram of a testing apparatus for moisture generation responsiveness.
Figure 2:
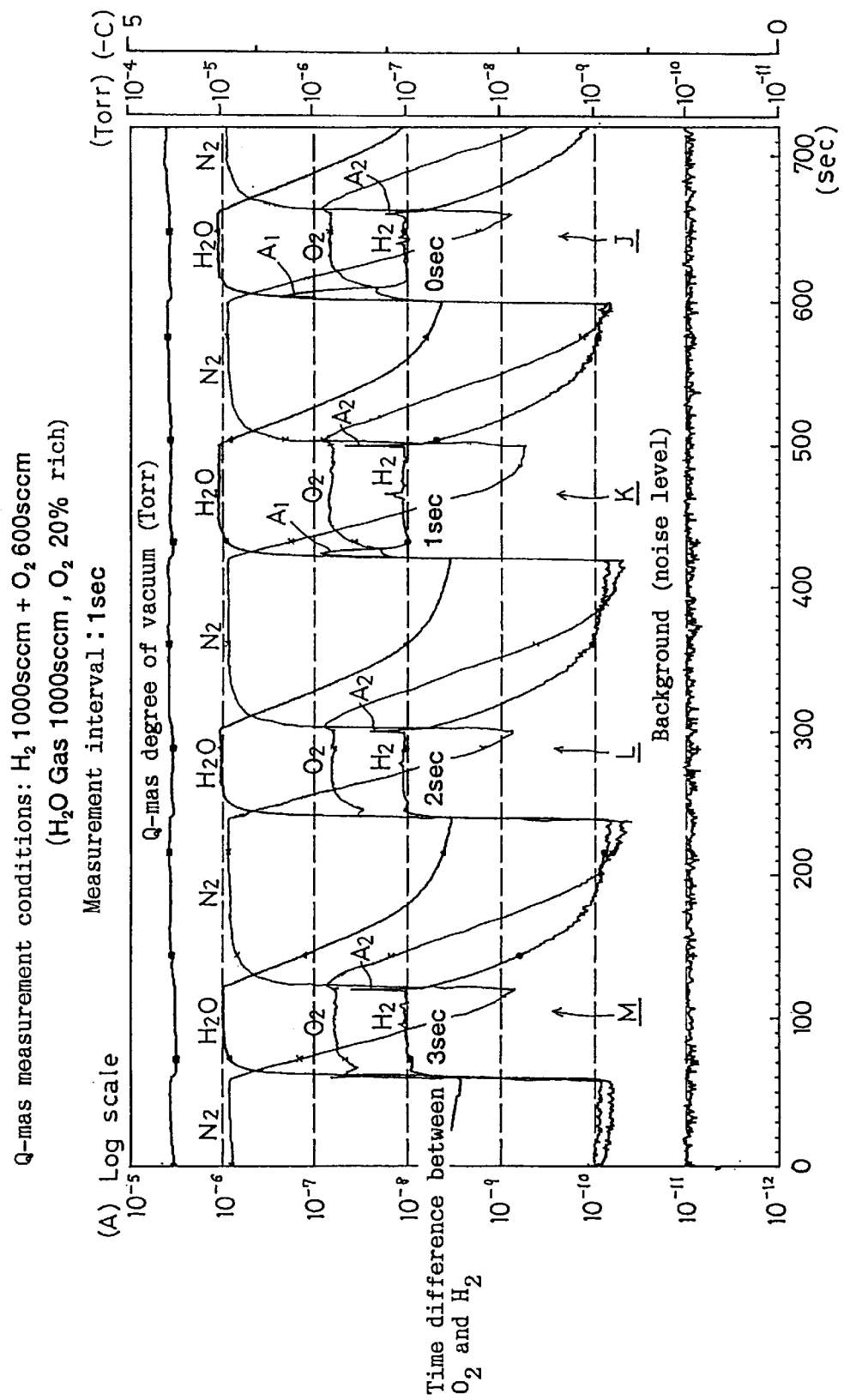
FIG. 2 is a diagram showing the measurement results of moisture generation responsiveness in Case 1.
Figure 3:
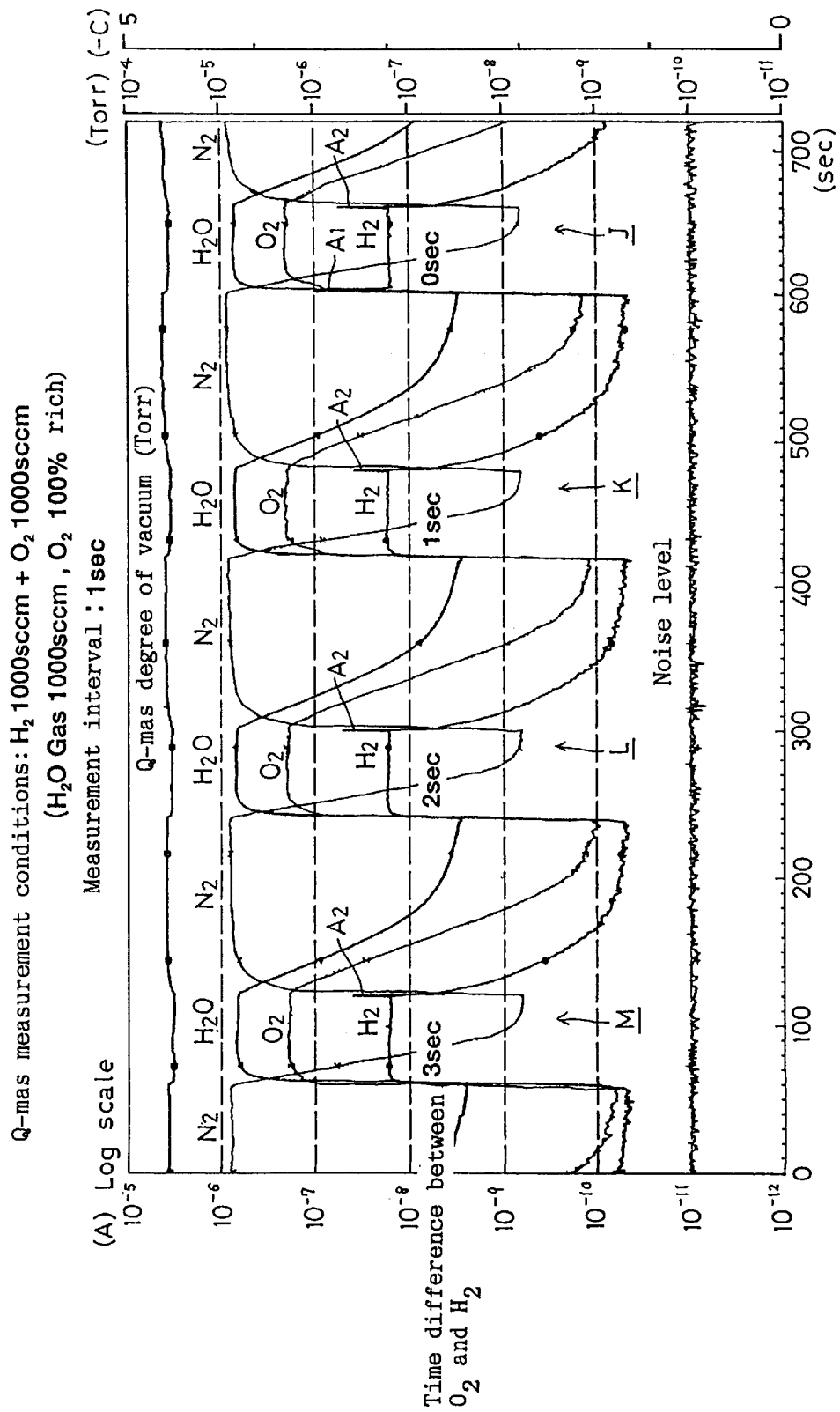
FIG. 3 is a diagram showing the measurement results of moisture generation responsiveness in Case 2.
Figure 4:
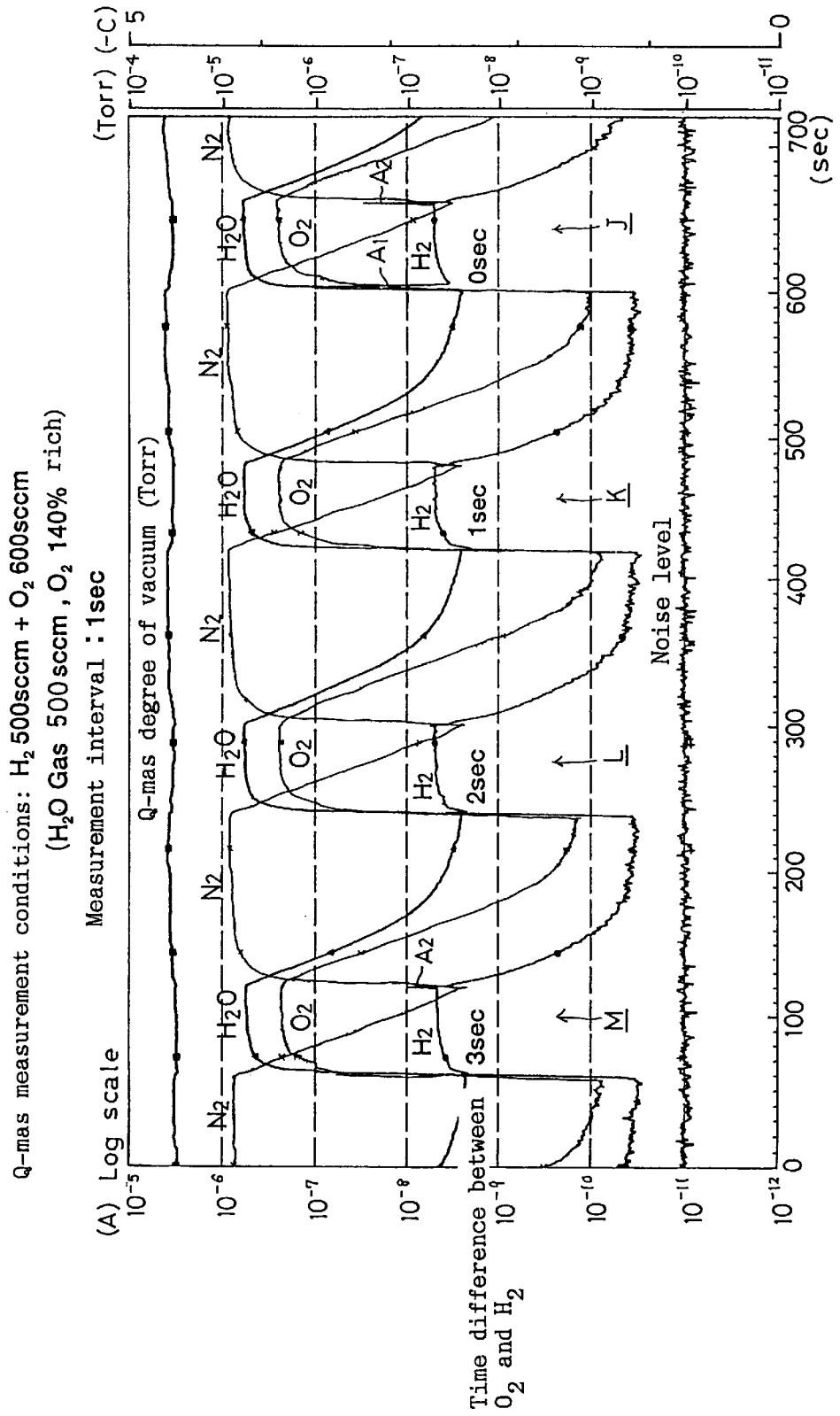
FIG. 4 is a diagram showing the measurement results of moisture generation responsiveness in Case 3.
Figure 5:
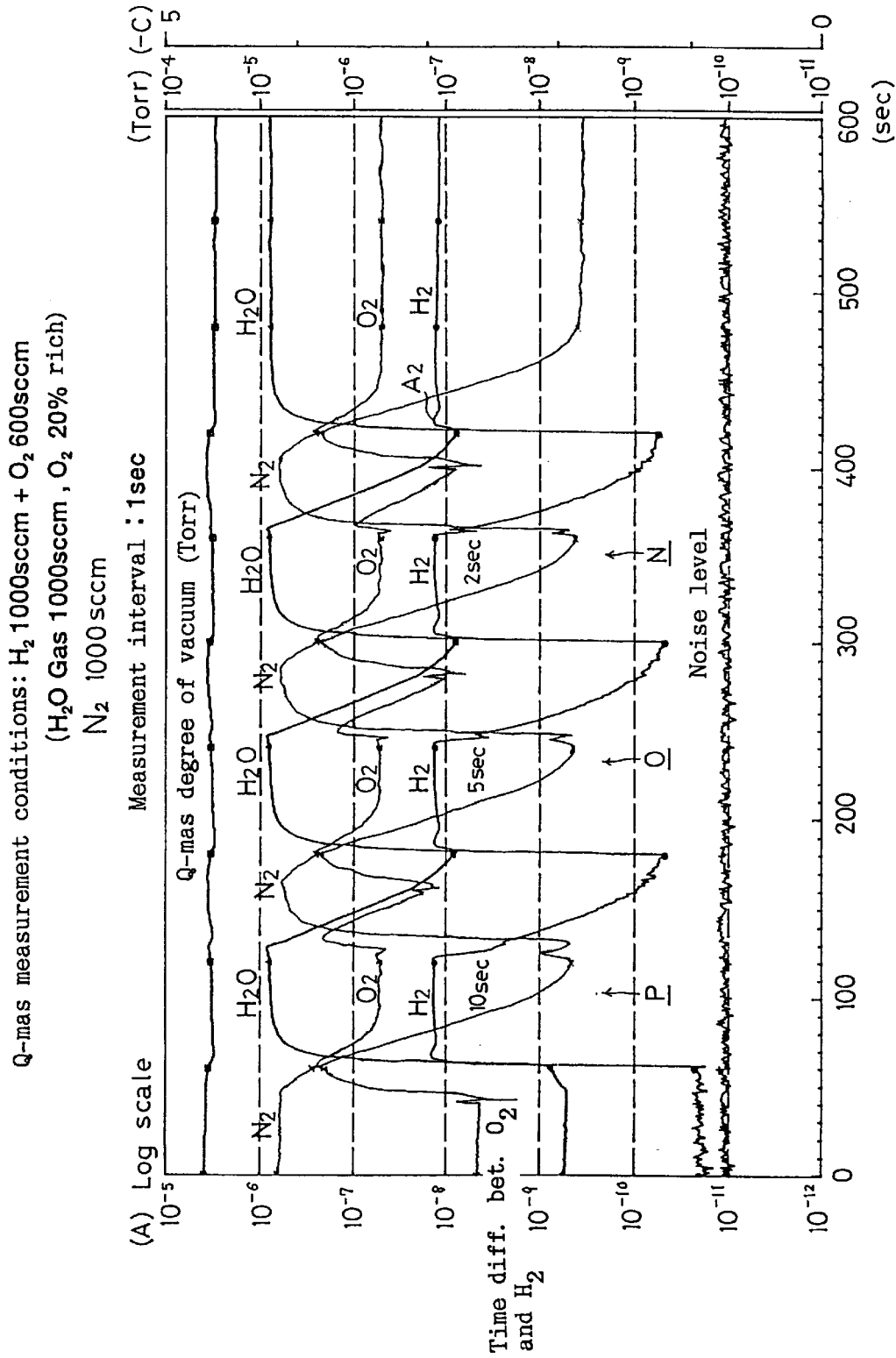
FIG. 5 is a diagram showing the measurement results of moisture generation responsiveness in Case 4.
Figure 6:
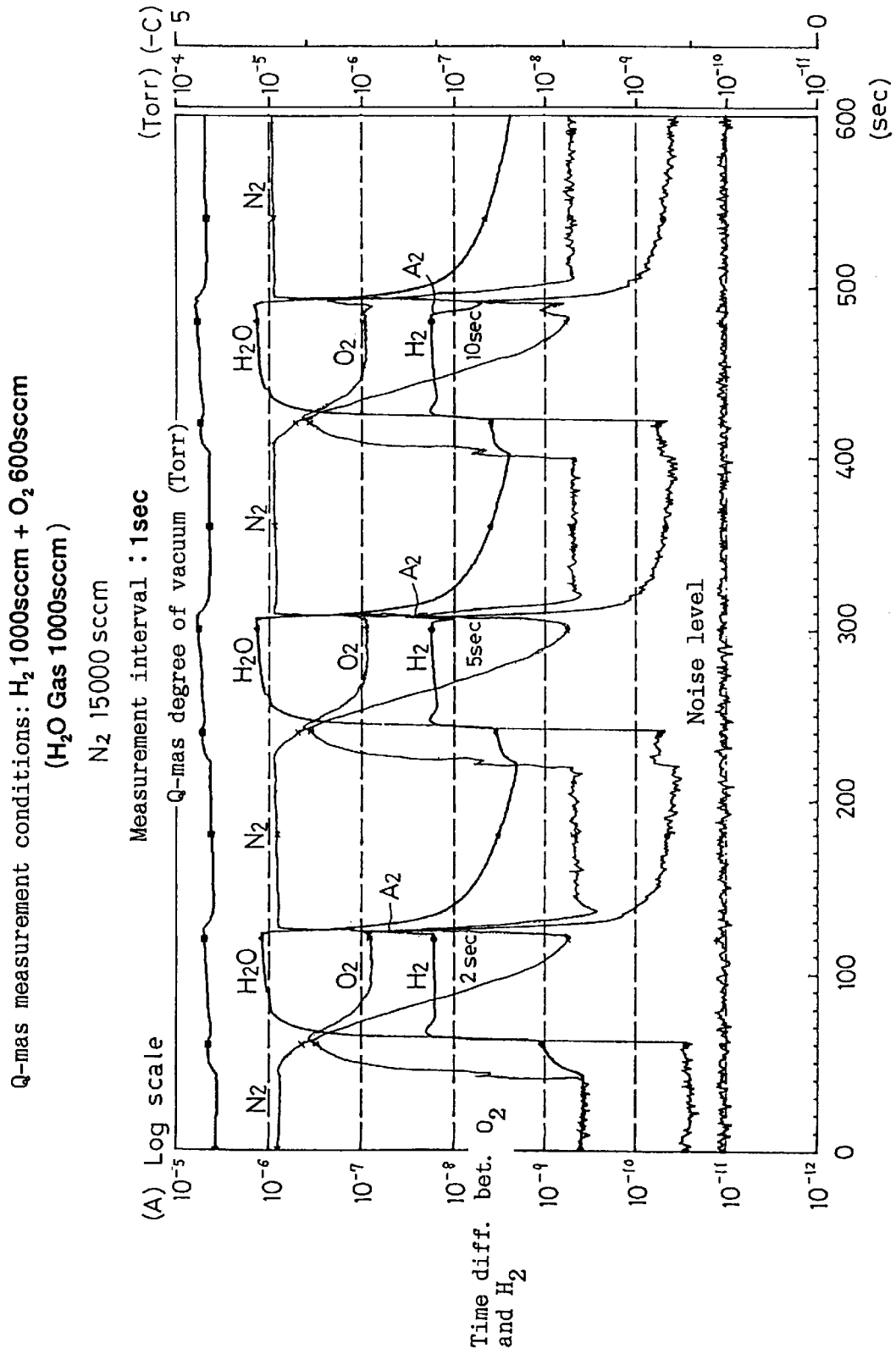
FIG. 6 is a diagram showing the measurement results of moisture generation responsiveness in Case 5.
Figure 7:
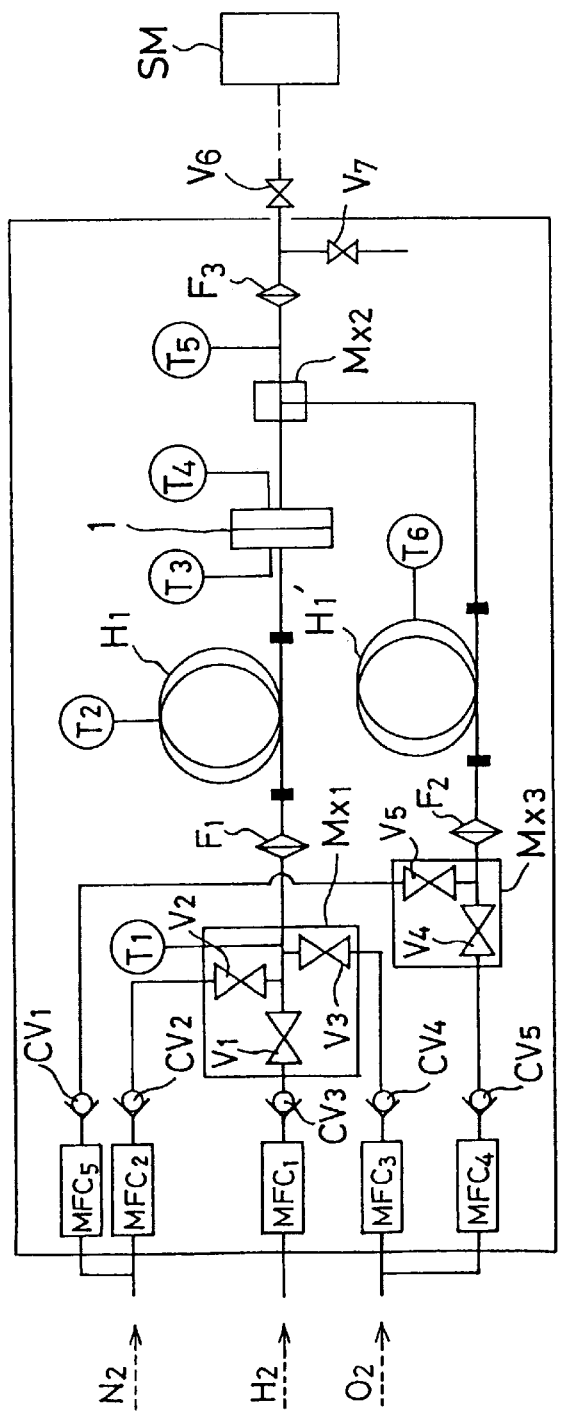
FIG. 7 is a schematic diagram illustrating an embodiment of the present invention.

FIG. 7 is a schematic diagram illustrating an embodiment of the present invention, showing the flow system of the reactor for the generation of moisture for use in semiconductor manufacturing, to which the present invention is applied. In FIG. 7, $H_2$ indicates hydrogen; $O_2$, oxygen; $N_2$, purging nitrogen gas; $MFC_1$ to $MFC_5$, mass flow controllers; V1 to V7, valves; T1 to T6, thermocouples to measure the temperature; CV1 to CV5, check valves; F1 to F3, filters; $H_1$ and $H_1'$, gas preheater coils; M×1, an oxygen-hydrogen mixer; M×2, an oxygen-water mixer; 1, the reactor; and SM, semiconductor manufacturing facilities.

The flow rate ratios of hydrogen and oxygen which are fed into reactor 1 are set properly, for instance, to 1000 sccm: 500 sccm or 1000 sccm: 600 sccm. Generally, a 20 percent excess of oxygen is present in the gas mixture that is sent into the reactor. In the present embodiment, the feeding pressure of oxygen and hydrogen is set at 1.0 to 3.0 kg/cm$^2$·g. The flow rate of oxygen is set to about 600 sccm while the flow rate of hydrogen is set to approximately 1000 sccm, and approximately 1000 sccm of moisture is generated.

The gas preheating coils $H_1$ and $H_1'$ are to heat the mixture gas or oxygen to a desired temperature not higher than 200° C. Reactor 1 is provided with a heater and, as necessary, a cooling unit so that if the reaction heat pushes up the temperature in the reactor in operation to over 500° C. (which rarely happens, though), the cooling unit will be activated to bring the temperature down below 500° C.

The mixture in the mixer M×2 provided near the outlet of the reactor is constantly maintained at approximately 120° C. to prevent water from condensing on the pipe wall. A heater is provided as necessary.

In the present embodiment, hydrogen and oxygen are fed in a gaseous form. Those material gases may, however, be in a liquefied form. Also, hydrogen and oxygen are premixed in mixer M×1 before being fed into reactor 1. Hydrogen and oxygen may, however, be sent into the reactor separately and mixed in the reactor 1.

It is also noted that moisture from the reactor is mixed with oxygen in the mixer M×2. In place of oxygen, other gases such as an inert gas and $N_2O$ may be used as diluent. $N_2O$ is used to improve the interfacial characteristics between Si and $SiO_2$.

In the present invention, before starting up moisture generation reactor 1, equipment such as the mass flow controllers MFC1 to MFC4 and temperature controllers are first prepared for operation, while valves V2, V5, and V7 are opened and valves V1, V3, V4, and V6 are closed, to purge the system with nitrogen gas. Then valves V2, V5, and V7 are closed. At the same time, or after a lapse of a certain time, valves V3 and V6 are opened to first feed oxygen into the system. Then, after a specific set time, preferably at least one second after the opening of valves V3 and V6, valve V1 is opened to feed hydrogen into the system.

The feeding of hydrogen is started after the feeding of oxygen is started at the time of initiation of the moisture generation reactor to keep down the peak $A_1$ of unreacted $H_1$ in the moisture which is generated, as mentioned above. Delaying the feeding of hydrogen by approximately one second can bring down the peak $A_1$ of unreacted $H_2$ to a negligible level in the case of a reactor having the construction and capacity (about 1000 ccm) used in the present example. That delay time can be shortened to not longer than one second if the gas supply system is configured so that when the valves V1 and V3 are opened, the flow of hydrogen and oxygen increases gradually to reach a specific level, by actuating mass flow controllers MFC1 and MFC3.

If, however, the start of hydrogen feeding is delayed too much after the start of oxygen feeding, dry oxygen oxidation of silicon can take place, as discussed above. It is most desirable to start hydrogen feeding one to two seconds after the start of oxygen feeding.

At the time of shutting down the moisture generation reactor, valve V1 is first closed to stop the supply of hydrogen. A specific set time after that, preferably approximately 2 seconds thereafter, Valve V3 is shut to stop the flow of oxygen. Cutting off the flow of hydrogen earlier can keep down the peak $A_2$ of unreacted $H_2$ in the generated moisture when shutting down the reactor. In case valves V1 and V3 are switched from the fully closed position to the fully opened position, if the flow of hydrogen is cut off approximately two seconds earlier, the peak $A_2$ of unreacted $H_2$ can be lowered to a negligible level.

If the supply of nitrogen is gradually increased by using mass flow controller MFC2 in the supply line in what is called a slow start, the peak $A_1$ of unreacted $H_2$ amount in the generated moisture further drops.

When terminating the operation of the reactor 1, even if the suspension of the supply of oxygen is long delayed after the suspension of the supply of hydrogen, that is, the supply of hydrogen is suspended too prematurely, it will have little effect on the quality of silicon oxide film, as mentioned above. Therefore, to secure the safety of the operation, it may be desirable to stop the flow of hydrogen slightly too early. But that means an increase in the consumption of oxygen. Hence, it is preferable to stop the oxygen approximately two seconds after the suspension of the supply of hydrogen.

EXAMPLE 2

Figure 8:
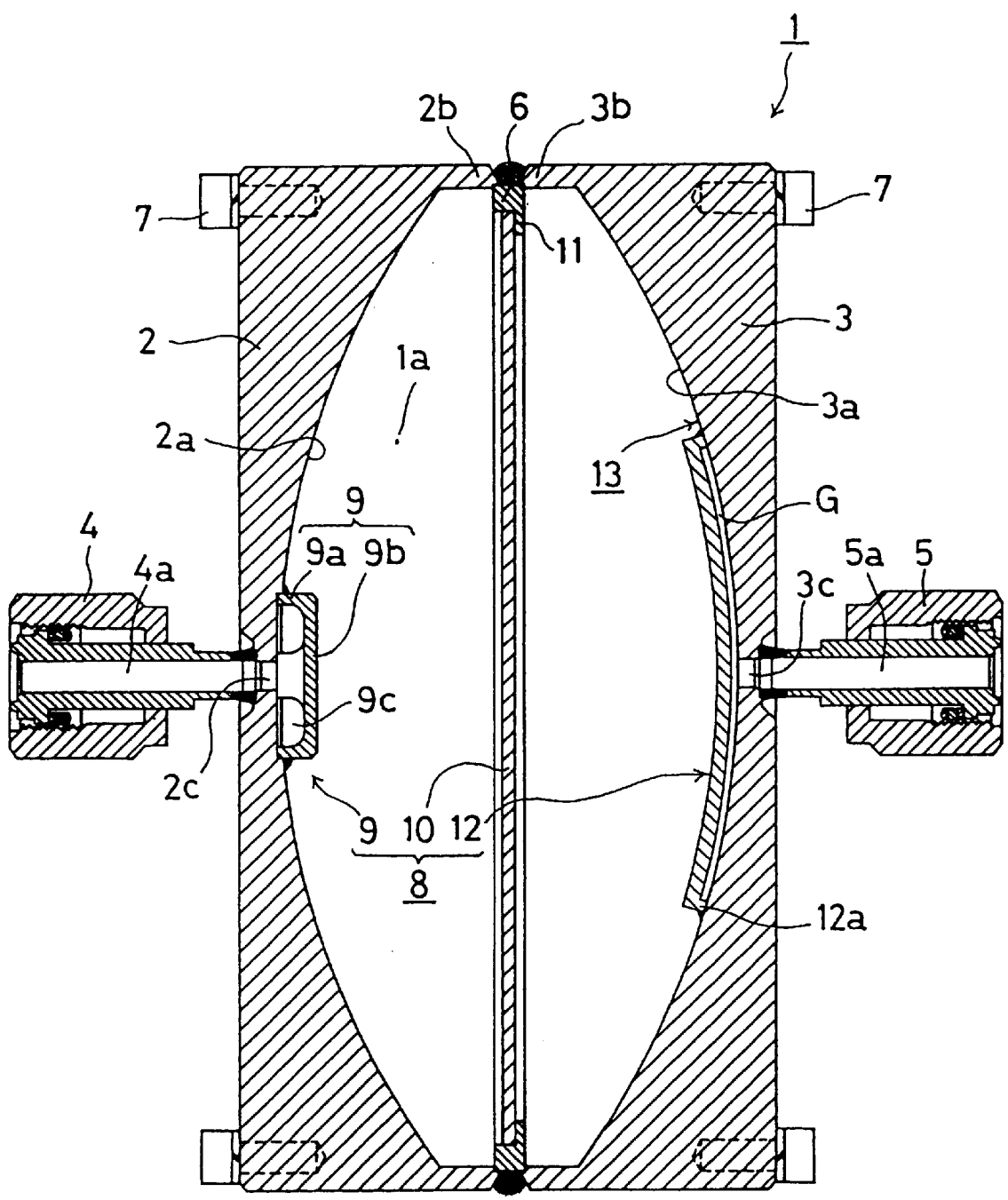
FIG. 8 is a vertical sectional view showing another example of a moisture generation reactor to which the present invention is applied.

Referring to FIG. 8: reference numeral 1 indicates a reactor; 1a, the interior space of the reactor; 2 and 3, reactor structural components; 2a and 3a, bottom walls of the reactor; 2c and 3c, gas passages; 4, a gas supply joint; 5, a moisture gas take-out joint; 5a, a moisture gas outlet passage; 6, a filter flange; 7, reactor mounting bolts; 8, gas diffusion means; 9, a reflector unit on the inlet side; 10, a filter; 11, a flange filter receiver; 12, a reflector unit on the outlet side; 13, a platinum-coated catalyst layer; and G, a gap passage.

Reactor 1 of FIG. 8 is short and cylindrical in shape, and is made up of two reactor structural components 2 and 3 welded together to be air tight. The two reactor structural components are made of stainless steel and are shaped roughly in the same form.

Gas diffusion means 8 includes the inlet reflector unit 9, the filter 10, and the outlet reflector unit 12, all provided inside of the reactor 1. Inlet reflector unit 9 is made up of a casing 9a and a reflector 9b blocking the inside end of the casing 9a. Inlet reflector unit 9 is provided with side openings 9c on the outer circumferential wall of casing 9a. Inlet reflector unit 9 is mounted at the position facing gas feed passage 2c, which is provided at the bottom of reactor structural component 2. Inlet reflector unit 9 is positioned concentrically with respect to gas feed passage 2c and is welded to structural component 2. Filter 10 is a stainless steel diffusion filter having through pores not larger than 200 microns in diameter. The diffusion filter used in the present example is a mesh filter with a mean diameter of 2 microns. A stainless steel filter flange 6 is welded around the outer edge of the filter 10. By means of that filter flange 6, filter 10 is welded to reactor structural components 2 and 3.

The outlet reflector unit 12 used in the present example is made of stainless steel (JIS designation SUS 316 L) and is shaped in the form of a partial spherical shell circular in peripheral shape and having a thickness of about 2 mm. This outlet reflector unit 12 has the same radius of curvature as the curved surface of bottom wall 3a or the concave surface of reactor structural component 3. This outlet reflector unit 12 is provided inside the reactor 1 and is positioned opposite the moisture gas outlet passage 3c in the bottom wall of the reactor structural component 3. Held apart from the inside wall of bottom wall 3a by a gap G of approximately 1 mm, the outlet reflector unit 12 is welded to the inside wall or reactor structural component 3 by means of four legs that are provided on the periphery of the unit 12.

The reactor 1 of FIG. 8 is 134 mm in outside diameter and approximately 70 mm in thickness. The volume of the interior space is about 390 $cm^3$. The catalyst layer is about 139 $cm^2$ in area. This reactor 1 can generate not less than 1000 sccm of moisture.

EXAMPLE 3

Figure 9:
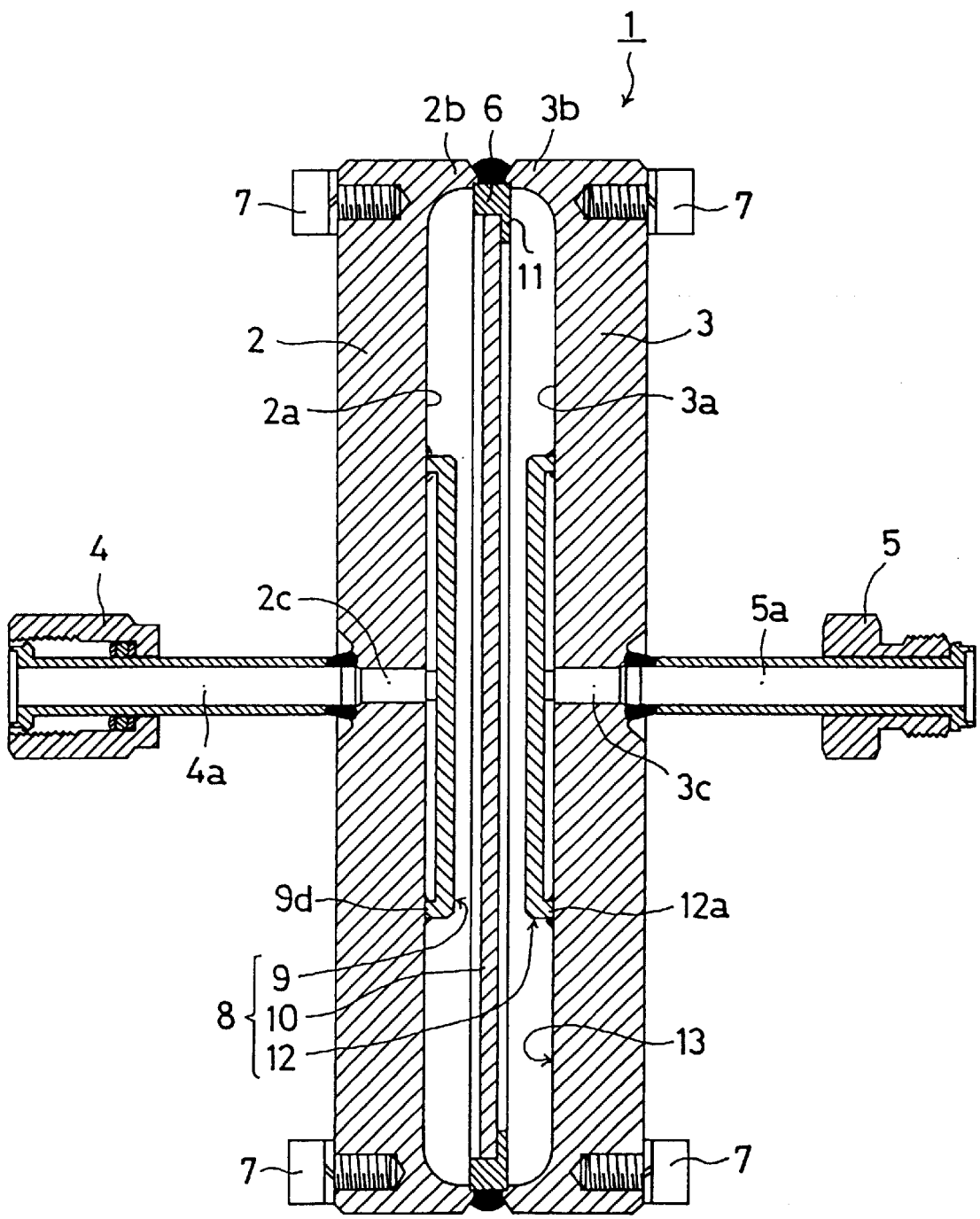
FIG. 9 is a vertical sectional view showing still another example of a rector for moisture generation to which the present invention is applied.
Figure 10:
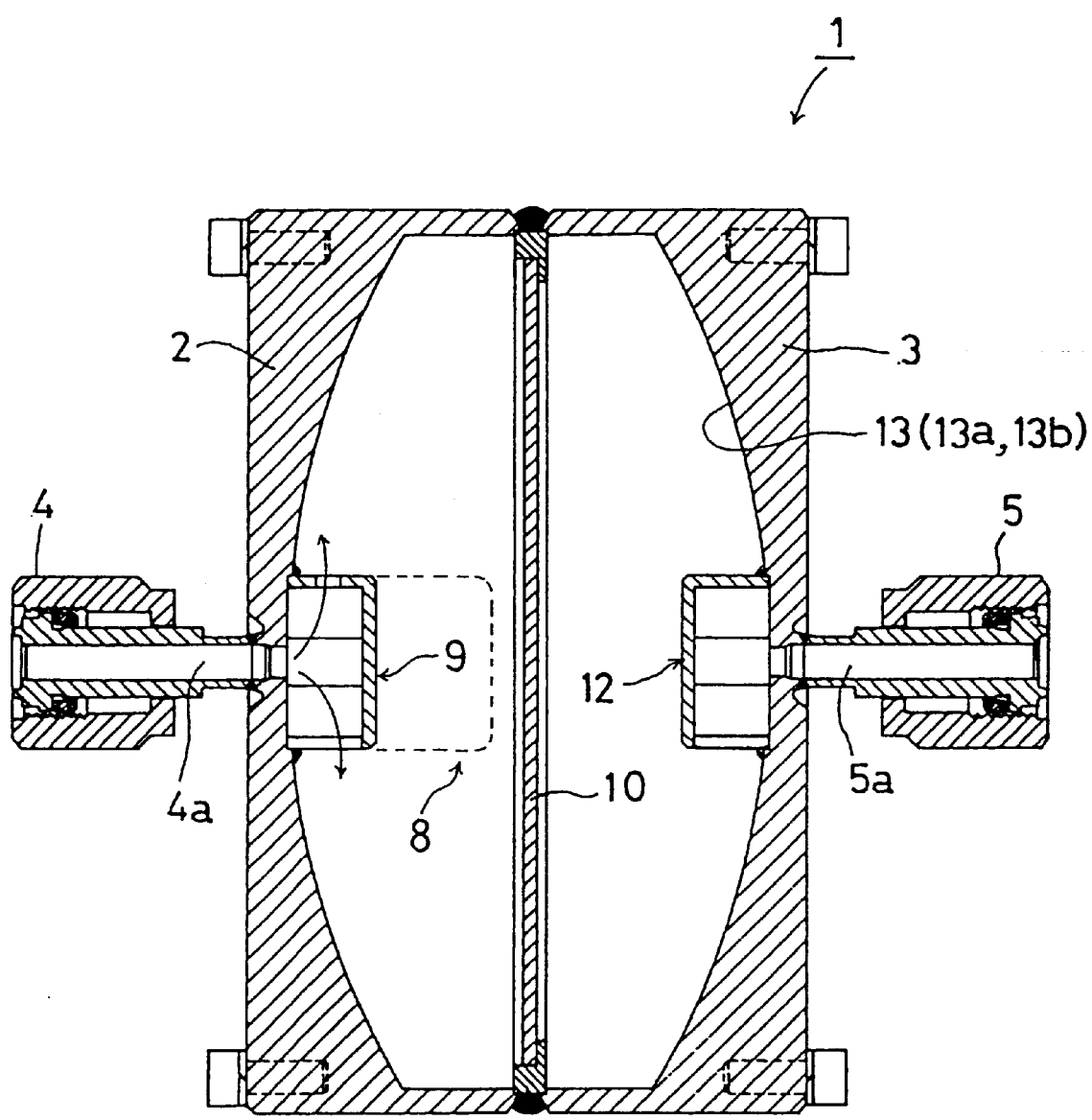
FIG. 10 is a vertical sectional view showing a reactor, disclosed in a previous patent application, for the generation of moisture to which the present invention is applied.
Figure 11:
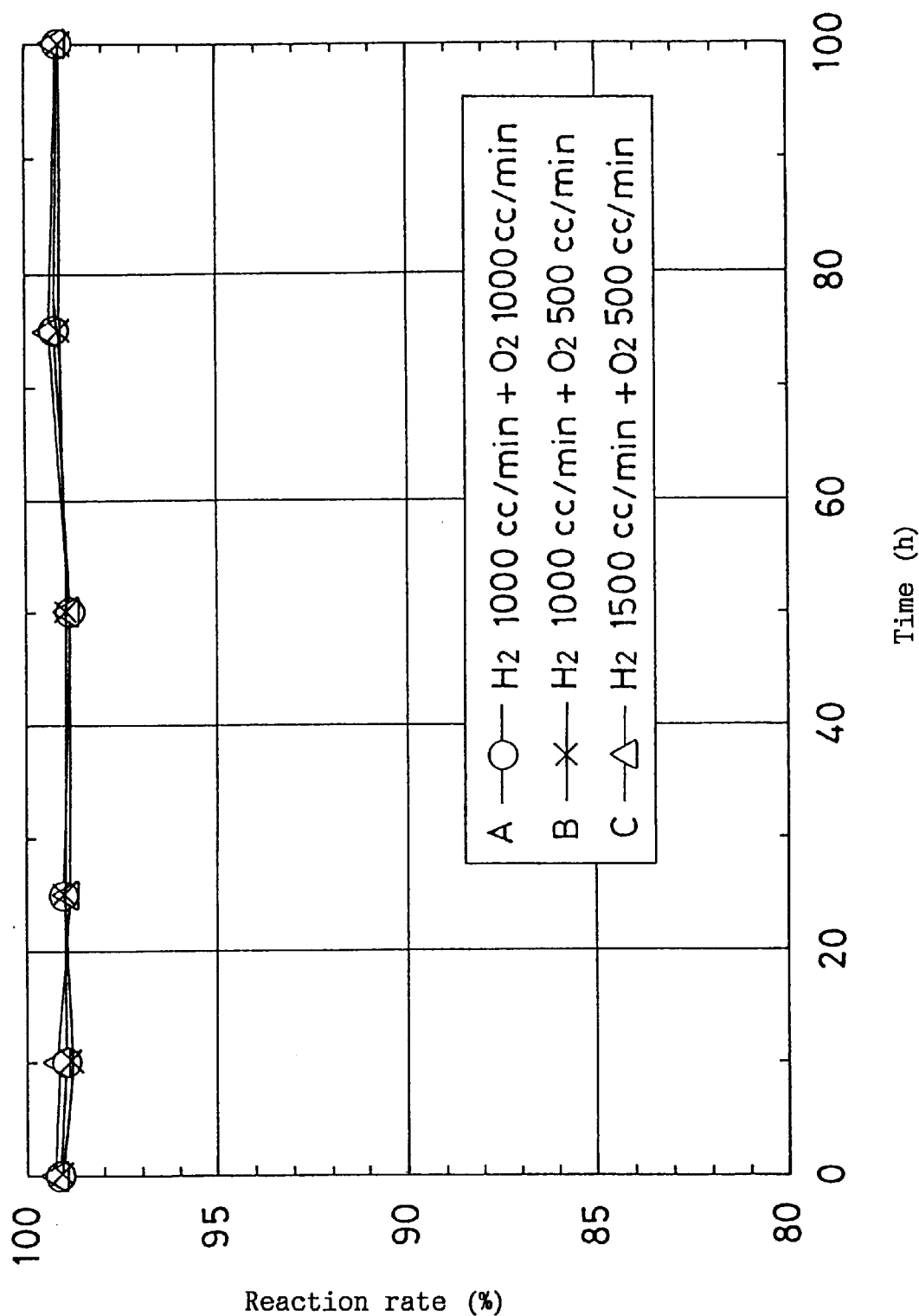
FIG. 11 depicts curves showing the moisture generation reaction rate of the reactor for the generation of moisture shown in FIG. 10.
Figure 12:
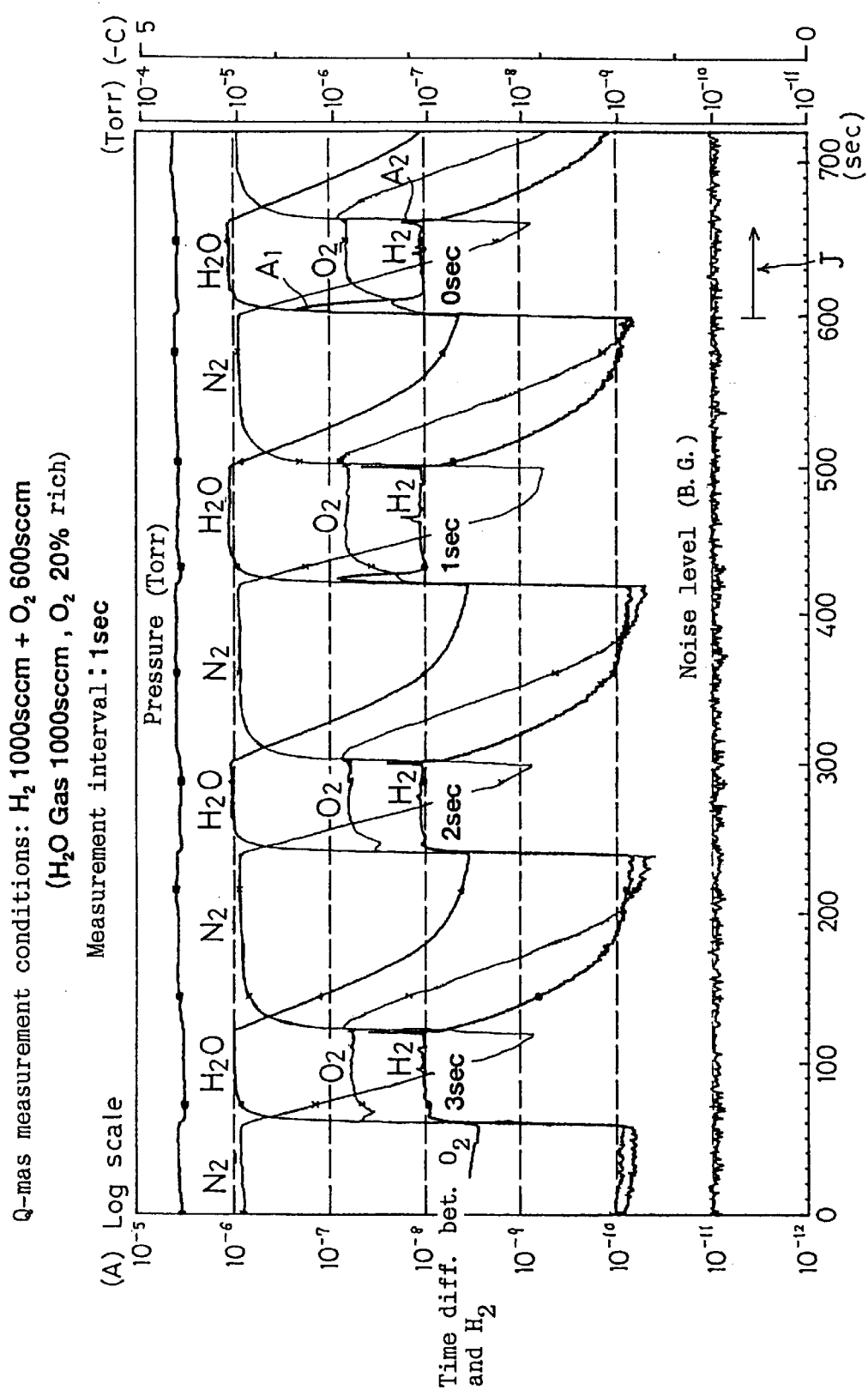
FIG. 12 depicts curves showing the moisture generation responsiveness at the time of start-up and cutoff of the feeding of hydrogen and oxygen into the reactor shown in FIG. 10.

FIG. 9 shows another type of the reactor 1 to which the present invention is applicable. In this reactor 1, the bottom walls 2a and 3a of structural components 2 and 3 are flat on the surface rather than spherical. The inlet reflector unit 9 and the outlet reflector unit 12 are flat disks made of stainless (JIS designation SUS 316 L). Thus, the thickness of the reactor 1 is reduced. The other parts such as the filter 10 and the platinum-coated catalyst layer 13 in this moisture generation reactor 1 are identical in construction to those of the reactor 1 shown in FIG. 8.

In FIG. 9, the inlet reflector unit 9 and the outlet reflector unit 12 are of about the same diameter. The outlet reflector unit 12 may be enlarged to approximately 90 mm in diameter. The moisture generation reactor 1 of FIG. 9 is 114 mm in outside diameter and approximately 31 mm in thickness. The volume of the interior space is about 86 $cm^3$. The catalyst layer is about 99 $cm^2$ in area. This reactor 1 can generate not less than 1000 sccm of moisture.

The present invention as defined in claim 1 and claim 4 provides a process for generating moisture for use in semiconductor manufacturing, comprising the steps of feeding hydrogen and oxygen into a reactor provided with a platinum-coated catalyst layer on the wall of its interior space, enhancing the reactivity of hydrogen and oxygen by catalytic action, and allowing the reactivity-enhanced hydrogen and oxygen to react instantaneously at a temperature below the ignition point to produce moisture without undergoing combustion at a high temperature, wherein hydrogen starts to be fed after oxygen has started to be fed when starting up the moisture generation operation, or wherein the feeding of hydrogen is stopped before the feeding of oxygen is stopped when bringing the moisture generation operation to an end. This invention can reduce to a negligible level the amount of unreacted hydrogen found in the moisture generated at the time of starting up or stopping the reactor, thus greatly ensuring the safety of semiconductor manufacturing facilities such as the silicon oxidation chamber.

The present invention provides a process for generating moisture for use in semiconductor manufacturing which further ensures safety at the time of starting up the reactor and reduces that amount of unreacted oxygen as supplied, thus preventing silicon oxide film coating by dry oxygen oxidation and maintaining the quality of silicon oxide film at a high level.

The present invention as defined in claim 2 and claim 3 provides a process for generating moisture for use in semiconductor manufacturing which further ensures the safety at the time of starting up the reactor and keeps down the amount of unreacted oxygen as supplied, thus preventing silicon oxide film coating by dry oxygen oxidation and keeping the quality of silicon oxide film at a high level.

The present invention as claimed in claim 5 provides a process for generating moisture for use in semi-conductor manufacturing which can significantly reduce the consumption of oxygen while ensuring the safety at the time of putting the reactor out of operation, thus resulting in a substantial saving of the material.

The present invention as claimed in claim 6 provides a process for generating moisture for use in semiconductor manufacturing which prevents the mixture gas of hydrogen and oxygen from undergoing combustion at a higher temperature and, under safe conditions, generates moisture for use in semiconductor manufacturing.

The present invention as claimed in claim 7 provides a process for generating moisture for use in semiconductor manufacturing which minimizes the peeling off and deterioration in catalytic performance of the platinum-coated catalyst layer on the inside wall of the interior space of the reactor, thus substantially lengthening the life of the platinum-coated catalyst layer.

What is claimed:

1. In a process for generating moisture for use in semiconductor manufacturing, said process comprising the steps of feeding hydrogen and oxygen into a reactor provided with a platinum-coated catalyst layer on an interior wall thereof, said catalyst layer enhancing the reactivity of hydrogen and oxygen by catalytic action and allowing the reactivity-enhanced hydrogen and oxygen to react instantaneously at a temperature below the ignition point to produce moisture without undergoing combustion at high temperature, the improvement which comprises feeding hydrogen into said reactor starting at least one second after the commencement of the feeding of oxygen into said reactor at the time of starting up the moisture generating operation.

2. The process for generating moisture for use in semiconductor manufacturing as defined in claim 1, wherein the feeding of hydrogen into the reactor commences from one second to two seconds after the commencement of the feeding of oxygen thereinto.

3. The process for generating moisture for use in semiconductor manufacturing as defined in claim 1, wherein the reactor is maintained at a temperature not greater than 500° C.

4. The process for generating moisture for use in semiconductor manufacturing as defined in claim 1, wherein the reactor is made of stainless steel and wherein the platinum-coated catalyst layer is made up of a platinum coat fixed on a barrier coat of nitride formed on an inside wall of the interior space of the reactor.

5. In a process for generating moisture for use in semiconductor manufacturing, said process comprising the steps of feeding hydrogen and oxygen into a reactor provided with a platinum-coated catalyst layer on an interior wall thereof, said catalyst layer enhancing the reactivity of hydrogen and oxygen by catalytic action and allowing the reactivity-enhanced hydrogen and oxygen to react instantaneously at a temperature below the ignition point to produce moisture without undergoing combustion at high temperature, the improvement which comprises suspending the feeding of hydrogen into said reactor at least two second prior to suspending the feeding of oxygen into said reactor at the time of terminating the moisture generating operation.

6. The process for generating moisture for use in semiconductor manufacturing as defined in claim 5, wherein the reactor is maintained at a temperature not greater than 500° C.

7. The process for generating moisture for use in semiconductor manufacturing as defined in claim 5, wherein the reactor is made of stainless steel and wherein the platinum-coated catalyst layer is made up of a platinum coat fixed on a barrier coat of nitride formed on an inside wall of the interior space of the reactor.

* * * * *